United States Patent [19]

Lutz

[11] Patent Number: 4,845,743
[45] Date of Patent: Jul. 4, 1989

[54] SYSTEM FOR SELECTIVELY RECEIVING TELEPHONE CALLS

[76] Inventor: Joseph M. Lutz, 200 St. Andrews Blvd., Apt. 3505, Winter Park, Fla. 32792

[21] Appl. No.: 190,347

[22] Filed: May 5, 1988

Related U.S. Application Data

[63] Continuation-in-part of Ser. No. 906,395, Sep. 12, 1986, Pat. No. 4,791,664.

[51] Int. Cl.4 .......................................... H04M 1/00
[52] U.S. Cl. ................................ 379/199; 379/387; 379/188
[58] Field of Search ............... 379/199, 200, 188, 387

[56] References Cited

U.S. PATENT DOCUMENTS

| | | | |
|---|---|---|---|
| 3,784,721 | 1/1974 | Kilby | 379/201 X |
| 3,829,616 | 8/1974 | Blouch | 379/188 |
| 3,902,016 | 8/1975 | Blouch | 379/102 |
| 4,006,316 | 2/1977 | Bogiano | 379/199 X |
| 4,074,078 | 1/1978 | Jansen | 379/199 |
| 4,446,334 | 5/1984 | Groff | 379/188 |

*Primary Examiner*—James L. Dwyer
*Attorney, Agent, or Firm*—Birch, Stewart, Kolasch & Birch

[57] ABSTRACT

A system for selectively receiving incoming telephone calls to a phoneset includes an automatic answering device which answers all incoming calls by placing a simulated phone load across the phone lines. The answering device also enables a dual tone multifrequency (DTMF) receiver to receive tone frequencies input by a caller. The DTMF receiver decodes the tone pulses into binary coded decimal values which are stored in successive storage registers. A comparator compares the values stored in the registers with a respective code input by the subscriber and outputs a signal when the code dialed in by the caller matches the code input by the subscriber. The signal activates an electronic ringer circuit which serves to alert the subscriber of the presence of an authorized call. An off-hook detector detects the pick-up of a phoneset by the subscriber and acts to disable the electronic ringer circuit. Upon the placing of the phoneset back into its cradle, the off-hook detector activates an automatic reset circuit which resets the automatic answering device as well as the code storage registers.

6 Claims, 6 Drawing Sheets

SYSTEM FOR SELECTIVELY RECEIVING TELEPHONE CALLS

This is a continuation-in-part of application U.S. Pat. Ser. No. 906,395 filed on Sept. 12, 1986 now U.S. Pat. No. 4,791,664.

BACKGROUND OF THE INVENTION

This invention relates generally to systems for attachment to a subscriber's telephone, and more particularly to systems for intercepting incoming telephone calls and allowing only those calls authorized by the subscriber to be put through to the subscriber's telephone set.

Annoyance telephone calls are a common everyday experience in modern society. Salesmen, solicitors and others often call at inconvenient times such as the dinner hour or late at night when they know a subscriber will be at home. Most people would prefer not to receive such calls, however, because of the possibility that an incoming call may be of an emergency nature or may be an important message, the incoming call must be answered.

In order to reduce the number of unsolicited telephone calls, many people have requested unlisted telephone numbers. However, this results in increased costs to the telephone subscriber, while not being totally effective in preventing the reception of unwanted and annoying telephone calls. This is because solicitors and others can usually find out the telephone number of a subscriber through various means including the use of certain automatic sequential dialing machines.

SUMMARY OF THE INVENTION

It is thus an object of the present invention to eliminate the need for an unpublished or unlisted telephone number.

It is a further object of the present invention to preclude the reception by a subscriber of unwanted and annoying telephone calls.

It is a still further object of the present invention to provide a system for selectively receiving incoming telephone calls by allowing a subscriber to select a numeral code which must be dialed by an outside caller in a order to indicate the presence of an incoming telephone call to the subscriber.

The objects of the present invention are fulfilled by providing a system for selectively receiving incoming telephone calls comprising tone decoder means responsive to an incoming tone pulse for outputting a binary coded decimal value corresponding to the frequency of the incoming tone pulse, code selector means for sequentially storing a plurality of binary coded decimal values that are input by a subscriber and comparator means responsive to the code selector means and the binary coded decimal values output by the tone decoder means for comparing the respective values and providing an output signal when the respective values are equal, and ringer means responsive to said output signal from said comparator means for alerting a subscriber of the presence of an authorized incoming call.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF PREFERRED EMBODIMENTS

Figure 1:
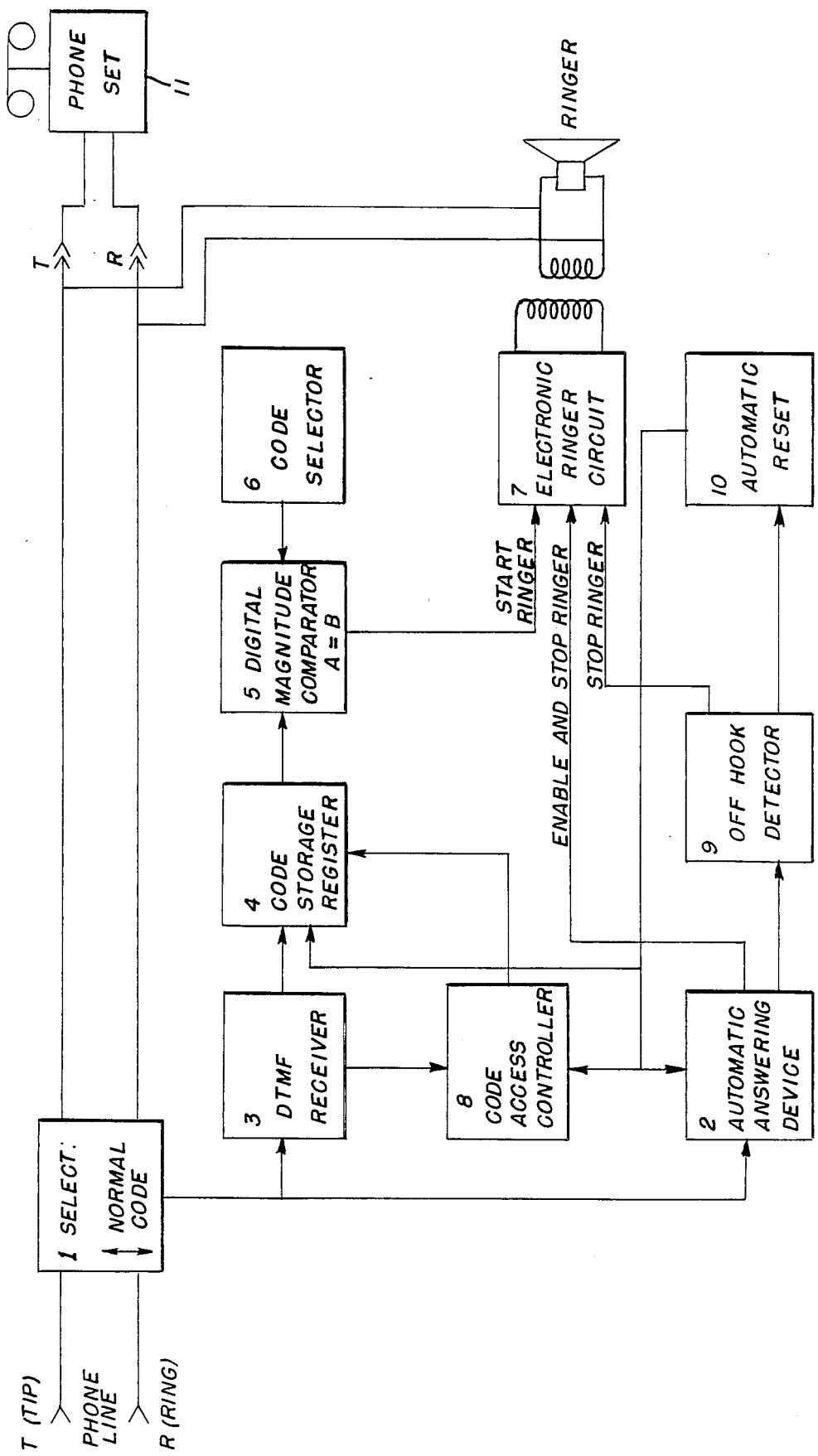
FIG. 1 is a block diagram of one preferred embodiment of the present invention.

FIG. 1 is a block diagram illustrating the basic concept of a preferred embodiment of the present invention wherein element 1 is a mode select circuit for selecting either a normal mode wherein the phone set 11 is directly connected to the phone lines T and R, or a coded mode in which the phone line is routed to an automatic answering device 2 which answers an incoming call by placing a simulated telephone load across the phone lines and enables a DTMF receiver 3 and electronic ringer circuit 7 for alerting a subscriber of the presence of an authorized telephone call. After the call has been answered by the automatic answering device 2, the device sends back a confirmation tone to indicate that a coded phone set has been reached, then the outside caller sequentially dials a three digit code using a standard touchtone system, which digits are detected by DTMF receiver 3 and are decoded to output a binary coded decimal value into a code register 4, which register is controlled by code access controller 8 in conjunction with the signals received by the DTMF receiver 3.

A specific three digit code selected by the subscriber using code selector 6 is compared with the three digits dialed in by the outside caller using a digital magnitude comparator 5. When the three digit code dialed in by an outside caller matches the code input by the subscriber, digital magnitude comparator 5 provides an output signal to the electronic ringer circuit 7 which starts the ringer circuit ringing to alert the subscriber of the presence of an authorized call. As the subscriber picks up the phone set, off-hook detector 9 senses that the phone set has been picked up and sends a disable signal to the electronic ringer circuit 7 in order to terminate the audible ringing of the ringer circuit.

Upon the completion of a conversation, and the replacing of the phone handset into its cradle, off-hook detector 9 sends a signal to the automatic reset circuit 10 which resets the automatic answering device 2 as well as code access controller 8 and code storage register 4 to place them in a standby mode for the next incoming call.

The various circuit elements of the present invention as illustrated in FIG. 1 will now be described with reference to FIGS. 2–4.

Figure 2:
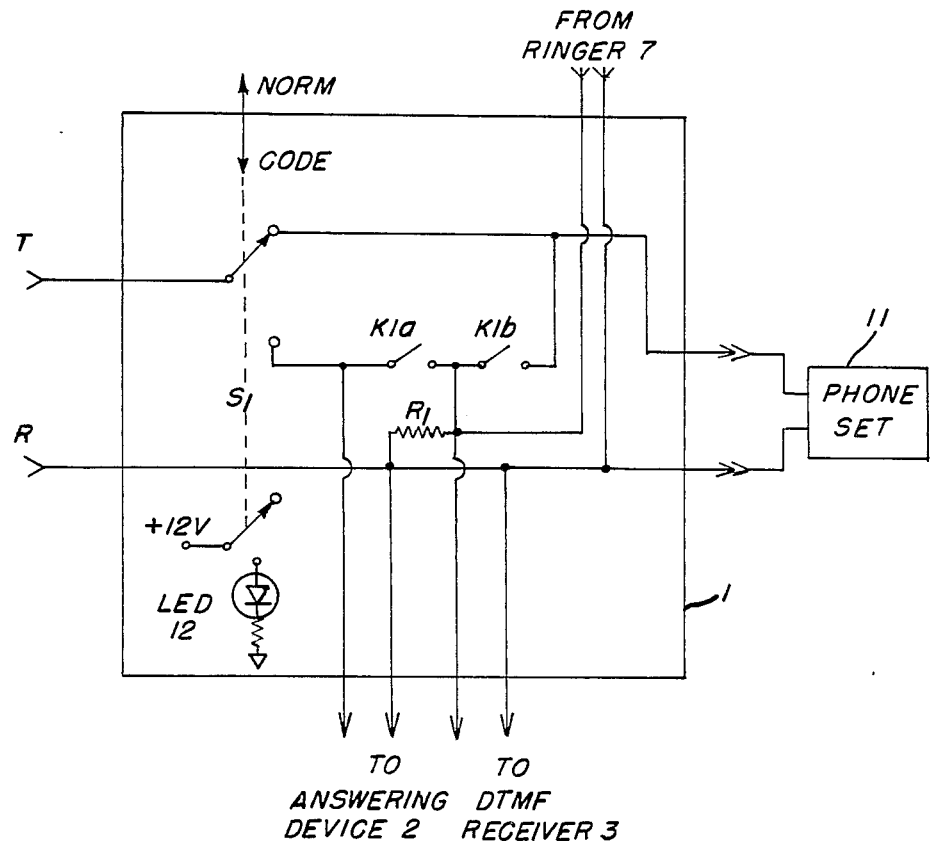
FIG. 2 is a schematic diagram of the select circuit 1 of FIG. 1.

As shown in FIG. 2, the mode select switch circuit 1 contains a manual selector switch S1, which disconnects the phone line from the telephone set and connects it to the the automatic answering device 2 when the switch S1 is placed in the code mode by the subscriber. When switch S1 is placed in the normal mode, as shown in FIG. 2, the phone set 11 is directly connected to the telephone line and will receive any and all incoming calls. An LED 12 is provided to indicate when the system is in the coded mode via a ganged switch connected to S1.

Figure 3:
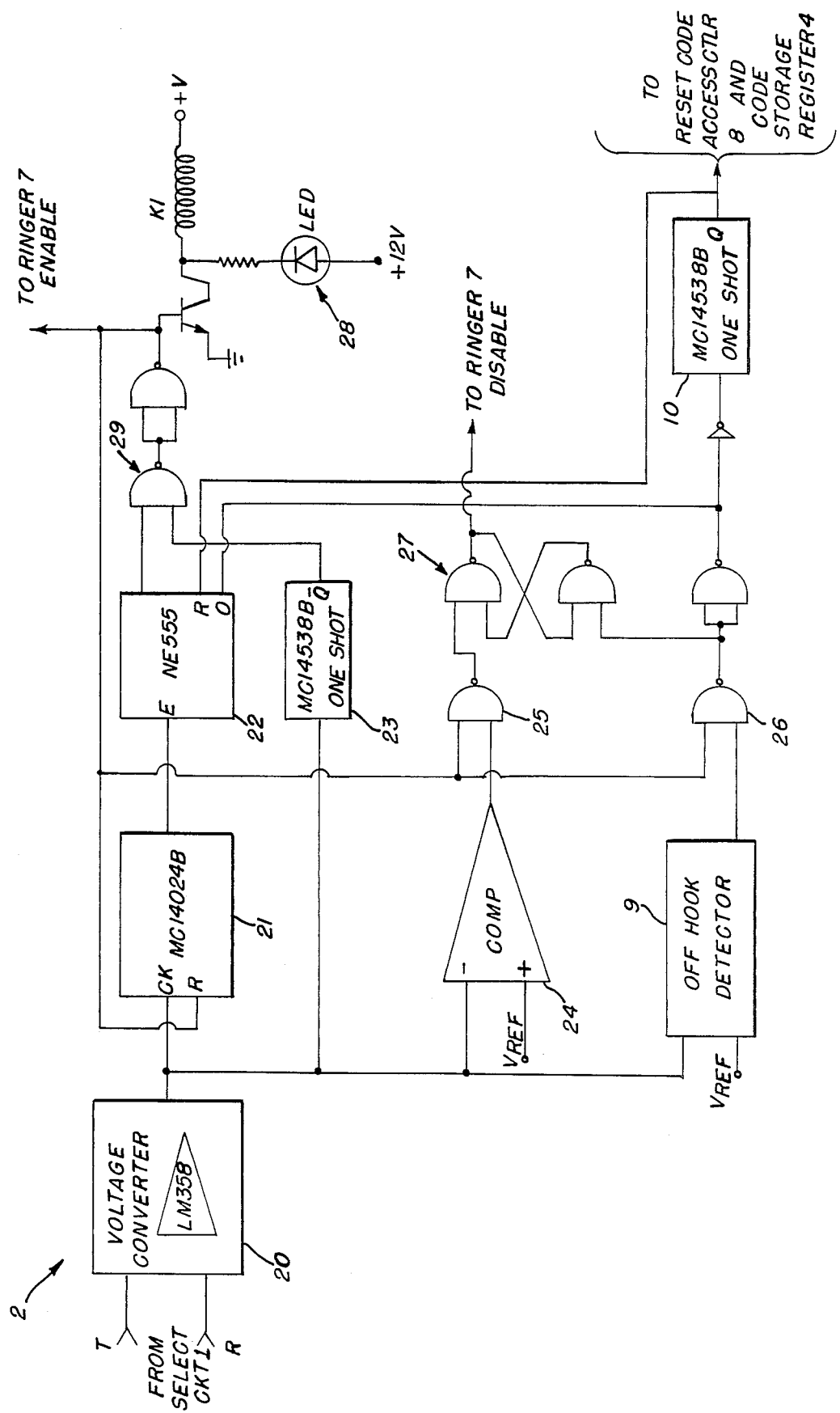
FIG. 3 is a simplified schematic diagram of the automatic answering device 2, off-hook detector 9, and automatic reset circuit 10 of FIG. 1.

Referring to FIG. 3, the automatic answering device 2 comprises a voltage converter 20 comprising a standard differential amplifier LM 358 which converts the standard −48 volt central telephone office voltage into a +12 volt DC level which is the positive logic level of the present system. The output of voltage converter 20 is simultaneously connected to a 7 bit binary counter 21, a voltage comparator 24, off-hook detector circuit 9, and a retriggerable one-shot device or monostable multivibrator 23. The output of 7 bit binary counter 21 is connected to a 555 timer 22, whose output is consequently connected to a NAND gate. The one-shot circuit 23 provides the other input to the NAND gate connected to the 555 timer.

Figure 5:
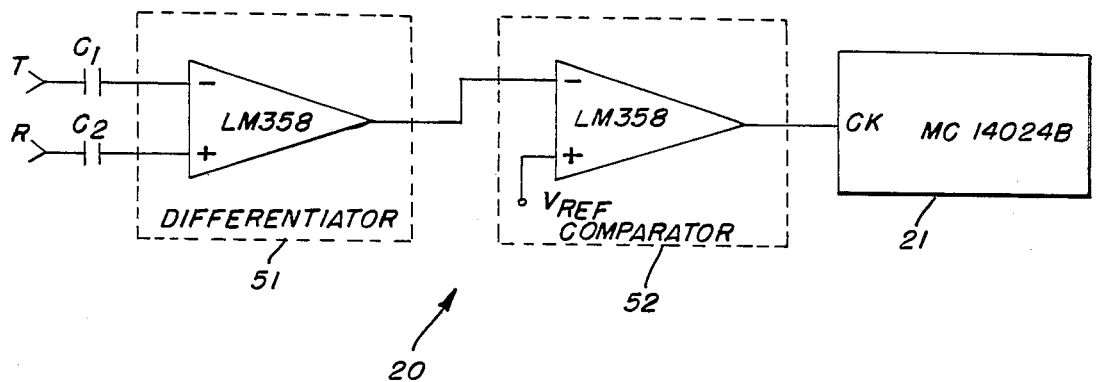
FIG. 5 is a simplified schematic diagram of an alternate embodiment of the voltage converter 20 of FIG. 3.

FIG. 5 shows an alternate embodiment of the voltage converter 20 of FIG. 3 in which the converter is replaced by a differentiator circuit 51 capacitively coupled to the phone lines via capacitors $C_1$ and $C_2$ and a comparator circuit 52 having an input connected to the output of the differentiator 51.

A survey has shown that a significant number of residential phonesets are connected with the tip (T) and ring (R) lines reversed. If this situation remains uncorrected, the automatic answering device will not function properly. Consequently, the voltage converter 20 may be replaced by a capacitively coupled differentiator circuit 51 which is responsive to voltage peaks in either direction. Comparator 52 converts these peaks into square wave signals that are applied to counter 21. In this way, the automatic answering device will operate correctly independent of the tip and ring line connections.

The output of voltage comparator 24 is connected to a further NAND gate 25 and the output of off-hook detector 9 is connected to a NAND gate 26. The other inputs of NAND gates 25 and 26 are connected to the output of the timer 22 via a NAND gate connected as an inverter. The outputs of 25 and 26 are connected to a one bit memory latch 27. The output of latch 27 is connected to a disable input of ringer circuit 7. The output of NAND gate 26 is further provided to the input of automatic reset circuit 10 which is also a one shot device. The output of one shot device 10 is connected to the reset input of timer 22, as well as the respective reset inputs of the code access controller 8 and code storage registers 4 as shown in FIG. 4. The output of NAND gate 29 is further connected via an inverter to a solenoid K1 and LED 28 via a transistor switch.

Figure 4:
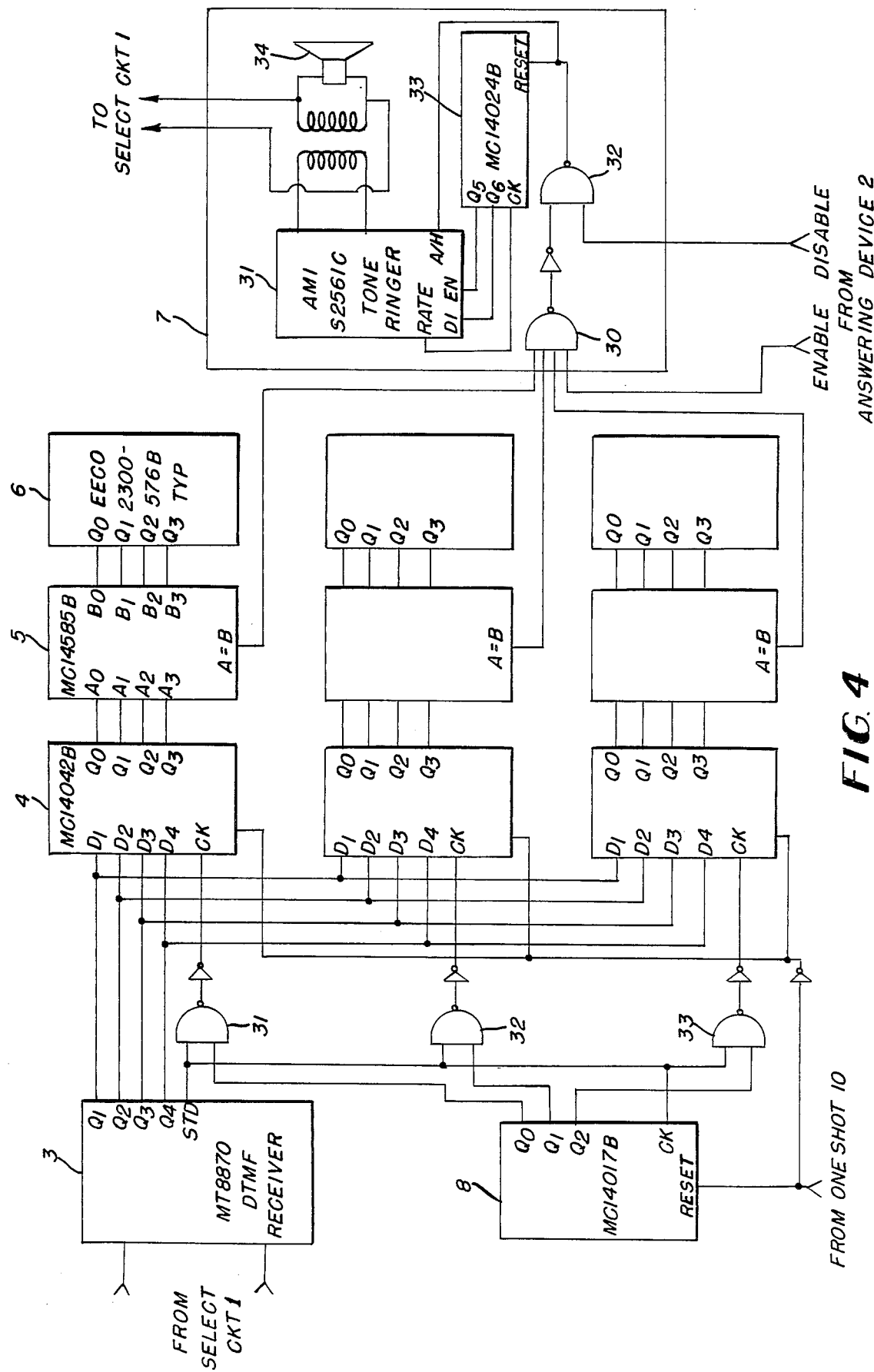
FIG. 4 is a simplified schematic diagram of the tone decoder DTMF receiver 3, digital comparator 5, and electronic ringer circuit 7 also of FIG. 1.

Referring now to FIG. 4, DTMF receiver 3 is connected to the telephone line via the mode select circuit 1. The outputs Q1 to Q4 of receiver 3 are simultaneously connected to inputs D1 to D4 of three code storage registers 4. The Q0 to Q3 outputs of code registers 4 are input to the A0 to A3 inputs of digital magnitude comparators 5. The B0 to B3 inputs of digital comparators 5 are connected to the Q0 to Q3 outputs of code selectors 6 which have been preprogrammed by a subscriber to output specific binary coded decimal values. The respective A=B outputs of the digital comparators 5 are connected to the input of four input NAND gate 30 located within ringer circuit 7. The STD output of DTMF receiver 3 is simultaneously connected to one input of NAND gates 31 to 33 and the clock input of code access controller 8, which is a decimal counter.

Figure 6:
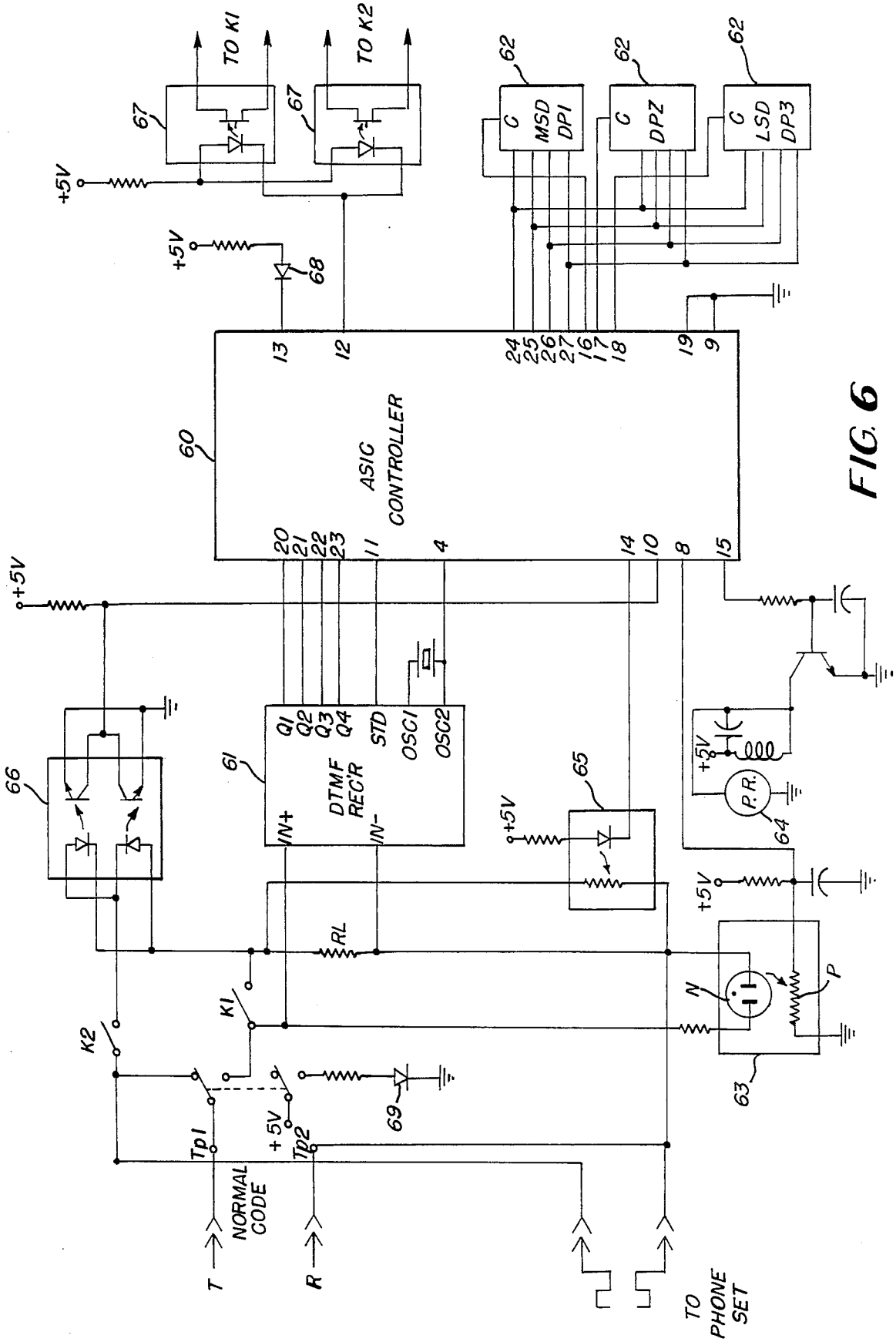
FIG. 6 is a block diagram of a second preferred embodiment of the present invention.

FIG. 6 illustrates a block diagram of a second preferred embodiment of the present invention, wherein an application specific integrated circuit (ASIC) controller 60 is utilized to detect the presence of an incoming call, compare code numbers dialed by a caller with reference code numbers, activate a piezo ringer to alert the subscriber of the presence of an authorized call, detect whether the subscriber has picked up the phone handset, and automatically release the phone line.

The second preferred embodiment as shown in FIG. 6 includes a standard DTMF receiver 61 which is connected to the tip (T) and ring (R) conductors of the phone line, code switches 62 which are commercially available switches such as Alco switch DRM-10-RA, neon ring signal detector 63, piezo ringer 64, tone interface circuit 65, off-hook detector 66, and photovoltaic relays 67. The embodiment of FIG. 6 further includes a red LED 68 indicating the presence of an incoming call on the phone line, and green LED 69 which indicates that the device is in the coded mode of operation.

Figure 7:
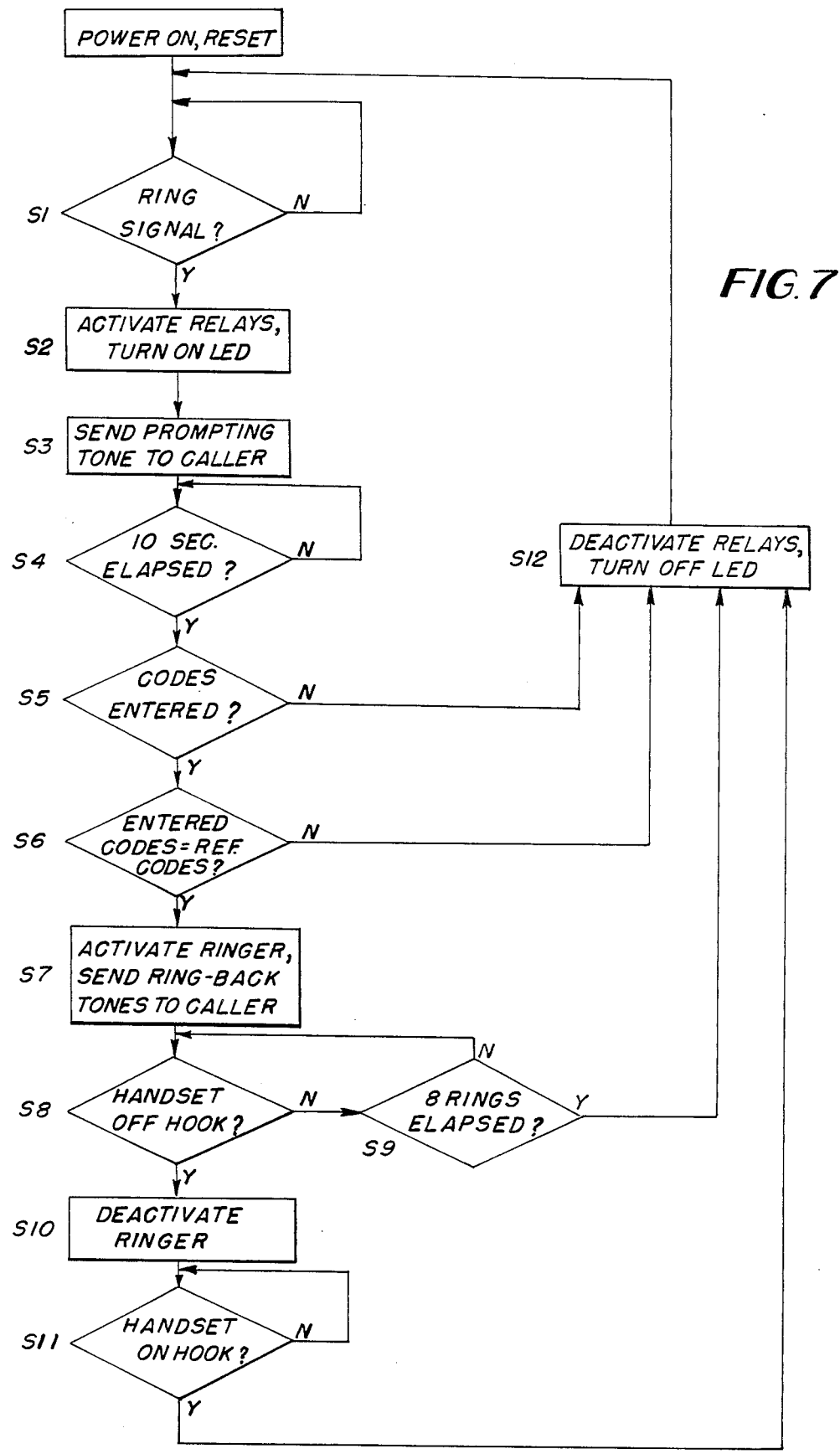
FIG. 7 is a flow chart explaining the operation of the embodiment of FIG. 6.

FIG. 7 is a flow chart explaining the operation of the ASIC controller 60 of the second embodiment of FIG. 6.

DESCRIPTION OF OPERATION

The operation of the first embodiment will now be described with reference to FIGS. 2–4.

Assuming that switch S1 is in the code position so that the answering device 2 is connected to the phone line, as the AC ring signal of an incoming call is detected by voltage converter 20 and converted to a square wave signal, the AC ring signal is detected by 7 bit binary counter 21 which counts the periods of the low-frequency ring signal. When a predetermined count is reached by counter 21, counter 21 provides an enable signal to 555 timer 22 to trigger the timer. Since the square wave of the AC ring signal is also fed to the one shot device 23, the output of the one-shot will disable NAND gate 29 until the end of a ring burst. As soon as the ring burst is ended, the one shot 23 will enable NAND gate 29 to turn on the relay K1 as well as LED 28, which indicates the presence of an incoming call. As relay K1 is activated, relay contacts K1a and K1b of the select circuit of FIG. 2 are closed. Relay contacts K1a and K1b function to respectively place resistor R1 as a load across the phone line to indicate to the central telephone office ringer that the incoming call has been acknowledged, and to connect the phone line to the inputs of DTMF receiver 3 as well as to phone set 11. The output of NAND gate 29 is also connected to a fourth input of NAND gate 30 of the ringer circuit 7 in order to enable the ringer circuit.

If no further action occurs, the line will stay acknowledged for about 75 seconds until the timer 22 times out and releases the line by deactivating the relay K1.

However, if the calling party is aware of this system and enters a three digit code which will be detected by the DTMF receiver 3, the communication can be established by turning on the internal electronic ringer 7. The DTMF frequency of a digit activated by the caller is detected by receiver 3 which outputs a BCD signal on outputs Q1 to Q4. The STD output of the receiver 3 goes to a high logic level when there exists any valid code number present at outputs Q1 to Q4. The STD output is the controlling signal for the code access controller 8. The outputs Q1 to Q4 are enabled only for the duration of a tone at the inputs of the DTMF receiver. Each time a tone is detected, code access controller 8 will count the presence of the tone and enable a respective output Q0 to Q2 which will selectively enable one of the code storage registers 4 to receive the BCD output from DTMF receiver 3. The code storage registers 4 are three-digit digital latch registers which provide temporary storage of the incoming code numbers. The digital magnitude comparators 5 have two BCD inputs, one of which is connected to a respective code storage register 4, and the other of which is connected to a respective code selector 6 which has been preset by the subscriber to output a particular BCD value. Whenever the digit input by the caller equals the respective digit preset by the subscriber in the code selector 6, the A=B output of the respective digital magnitude comparator 5 goes to a logic high level. When all three A=B outputs go to a logic high level, NAND gate 30 activates the tone ringer 31 of ringer circuit 7.

Whenever the resistor R1 is connected across the telephone line, comparator 24 will detect the resultant decrease in voltage drop across the telephone line and provide a signal to NAND gate 25 which in turn provides a signal to the disable input of NAND gate 32 in order to allow tone ringer 31 to be activated by an appropriate output signal from NAND gate 30 via binary counter 33. If a subscriber does not pick up the phone before timer 22 times out, the ringer will be stopped and the phone line released. If the phone set 11 is picked up by a subscriber within the predetermined period, off-hook detector 9 will detect the resultant further voltage drop across the phone line and output a signal to NAND gate 26 which will disable ringer circuit 7 by an appropriate signal to NAND gate 32. The output of NAND gate 26 is further provided via an inverter to the override input of timer 22 to maintain the timer in an on state thus preventing the timer from timing out during the continuation of a conversation. The ring signal of tone ringer 31 is provided to a speaker 34 and is also fed back to the calling party via the phone line to indicate that the subscriber's phone is now ringing.

After the conversation has been ended and the subscriber puts down the phone, the off-hook detector 9 senses the resultant increase in voltage drop across the line and switches its output to NAND gate 26. This transition is detected by the automatic reset circuit 10 which immediately applies a momentary pulse to the reset input of timer 22 thereby shutting off the timer and deactivating relay K1 in order to release the line. The output of the reset device 10 is also connected to the reset input of the code access controller 8 which functions to reset the controller 8 and is also connected to respective reset inputs of code storage registers 4 which function to input invalid code numbers into these registers in order to preclude the detection of a valid code from a previous call upon the reception of the next succeeding call.

The operation of the second embodiment of the present invention will now be described with reference to FIGS. 6 and 7.

When the device is in the coded mode of operation, ring detection circuit 63 detects a high voltage AC ring signal signifying the presence of an incoming phone call. The neon lamp N is responsive to the high voltage AC ring signal to emit a neon light, which impinges upon photoresistor P which changes its resistivity to provide a ring signal detect signal to pin 8 of ASIC controller 60. Code switches 62 are connected to pins 24, 25, 26 and 27 of ASIC controller 60 and are sequentially clocked by strobe signals appearing at pins 16, 17 and 18. The code switches are arranged from the most significant digit (MSD) to the least significant digit (LSD) as shown in the Figure. Referring to FIG. 7, after the device has been turned on and automatically reset, the ASIC controller is in a standby mode to detect the presence of a ring signal at step S1. Upon the detection of a valid AC ring signal from circuit 63, the ASIC controller activates relays 67 through pin 12, and turns on LED 68 through pin 13, indicating that the phone line is occupied. At step S3, the ASIC controller sends a 400 Hz prompting tone back to the caller via interface circuit 65 through pin 14. Tone interface circuit 65 consists of an LED/photoresistor opto isolator wherein the LED is driven by the prompt signal to cause the photoresistor to change resistance and thereby modulate the current passing through the phone line.

At step S4, the ASIC controller waits ten seconds for the caller to input the three digit code number. After the 10 seconds have elapsed, the ASIC controller determines whether the codes have been entered by DTMF receiver 61 at step S5. If the codes have not been entered, the controller proceeds to step S12 wherein the relays 67 and the LED 68 are deactivated thereby releasing the line and returning to the standby mode at step S1. If the codes have been entered, the controller proceeds to step S6 wherein the entered codes are compared with the reference codes stored by code switches 62, by sequentially strobing the switches from the most significant digit to the least significant digit at strobe outputs 16, 17 and 18. If the codes do not coincide, the controller proceeds to step S12 to release the line. If the codes match, the controller proceeds to step S7 to activate piezo ringer 64 at pin 15 and send ring-back tones to the caller at pin 14. At step S8, the controller determines whether the handset has been picked up by the subscriber. This is determined by off-hook detector circuit 66 which consists of a pair of LEDs and photo transistors which is activated by the change in load caused by the connection of the telephone receiver into the circuit, to apply an off-hook signal to the controller at pin 10. As shown at step S9, if the subscriber fails to answer the call after eight rings have been output by piezo ringer 64, the controller proceeds to step S12 to deactivate the relays and release the phone line. If the subscriber answers the call, the controller deactivates the ringer 64 at step S10 and proceeds to step S11 to wait for the subscriber to replace the handset in its cradle. This is also detected by change in signal at pin 10. After the call is completed, the controller proceeds to step S12 to deactivate the relays, turn off LED 68, and return to step S1 to await the presence of another AC ring signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for selectively receiving incoming telephone calls over a telephone line, comprising:

tone decoder means coupled to said telephone line and responsive to tone pulses dialed by a caller having accessed said telephone line, for outputting binary coded decimal values corresponding to the frequency of the dialed tones;

ring detector means responsive to an incoming AC ring signal from a caller for outputting a ring detect signal indicating the presence of said caller;

off-hook detector means responsive to the presentation of a telephone handset load to said telephone line for outputting an off-hook signal;

relay switch means for connecting said tone decoder means and said off-hook detector means to said telephone line;

code storage means for storing a plurality of reference binary coded decimal values input by a subscriber;

an application specific integrated circuit (ASIC) controller, coupled to said tone decoder means, ring detector means, off-hook detector means and relay switch means, including, means responsive to said ring detect signal for activating said relay switch means to connect said tone decoder means and off-hook detector means to said telephone line, means for outputting a prompt tone signal in response to the activation of said relay switch means, means for comparing said reference binary coded decimal values with said binary coded decimal values outputted by said tone decoder means, means responsive to a coincidence between said reference and tone decoder decimal values for producing a ringer signal, means responsive to said off-hook signal for terminating said ringer signal, means responsive to the termination of said ringer signal for deactivating said relay switch means in response to a subsequent absence of said off-hook signal, and means responsive to a non-coincidence between said reference and tone decoder decimal values for deactivating said relay switch means;

ringer means responsive to said ringer signal for alerting a subscriber of the presence of an authorized incoming call; and confirmation tone means responsive to said prompt tone signal for sending a prompt tone to a caller to input said tone pulses.

2. The system of claim 1, further comprising simulated handset load means for acknowledging an incoming call, said simulated handset load means connected across said telephone line by the activation of said relay switch means.

3. The system of claim 1, further comprising mode selector means for connecting said handset to said telephone line in a normal mode and connecting said ring detector means and said relay switch means to said telephone line in a privacy mode.

4. The system of claim 1, wherein said ASIC controller further includes means for counting a predetermined period of time after the outputting of said prompt tone signal, said means for comparing performing the comparison in response to the elapsing of said predetermined period of time.

5. The system of claim 4, wherein said ASIC controller further includes means responsive to a lack of binary coded decimal values from said tone decoder means after said predetermined period of time for deactivating said relay switch means.

6. The system of claim 1, wherein said ASIC controller further includes means for deactivating said relay switch means in response to the occurrence of a predetermined number of ringer signals during which no off-hook signal has been outputted by said off-hook detector means.

* * * * *